United States Patent

Giordano et al.

[11] Patent Number: 5,918,243
[45] Date of Patent: Jun. 29, 1999

[54] COMPUTER MECHANISM FOR REDUCING DASD ARM CONTENTION DURING PARALLEL PROCESSING

[75] Inventors: Thomas Paul Giordano; Thomas O. McKinley, both of Rochester; David Rolland Welsh, Byron, all of Minn.

[73] Assignee: International Business Machines Corporation, Armonk, N.Y.

[21] Appl. No.: 08/594,057

[22] Filed: Jan. 30, 1996

[51] Int. Cl.[6] .................................................. G06F 13/00
[52] U.S. Cl. ............................ 711/112; 711/150; 711/168
[58] Field of Search .................................. 711/112, 154; 395/673, 726, 674, 200.43, 200.45; 360/73.03

[56] References Cited

U.S. PATENT DOCUMENTS

| | | | |
|---|---|---|---|
| 4,423,448 | 12/1983 | Frandsen | 360/106 |
| 4,642,756 | 2/1987 | Sherrod | 395/673 |
| 5,070,423 | 12/1991 | Gloski | 360/106 |
| 5,237,466 | 8/1993 | Glaser et al | 360/73.03 |
| 5,276,878 | 1/1994 | Sutton et al. | 711/112 |
| 5,341,351 | 8/1994 | Ng | 369/30 |
| 5,390,336 | 2/1995 | Hillis | 395/800 |
| 5,392,433 | 2/1995 | Hammersley et al. | 395/726 |
| 5,404,521 | 4/1995 | Murray | 395/674 |
| 5,463,752 | 10/1995 | Benhase et al. | 711/154 |
| 5,463,754 | 10/1995 | Beausoleil et al. | 395/200.43 |
| 5,564,019 | 10/1996 | Beausoleil et al. | 395/200.45 |

*Primary Examiner*—Tod R. Swann
*Assistant Examiner*—Fred F. Tzeng
*Attorney, Agent, or Firm*—Schmeiser, Olsen & Watts

[57] ABSTRACT

In parallel process computer systems multiple tasks are simultaneously executed. However, where resource contention exists, the multiple tasks become serialized, reducing system performance. Once such resource contention is arm contention during reads for files stored under multiple arms on direct access storage devices (DASDs). According to the preferred embodiment, a method is provided that assigns read tasks in a manner that reduces the probability of arm contention during the file reads. First, the plurality of extents storing the file are correlated to their associated arm. Second, for each of the plurality of arms, the attributes of extents under that arm, preferably including the extent read times, are accumulated. Finally, the plurality of simultaneous read tasks are assigned to the plurality of extents according to the accumulated attributes such that arms that have a greater need for service are favored over arms that have a lesser need when reading the file. Assigning the tasks in this manner lessons the probability of arm contention during file reads, increasing system performance.

32 Claims, 5 Drawing Sheets

300

| ARM 1 | ARM 2 | ARM 3 | ARM 4 | ARM 5 | ARM 6 | ARM 7 |
|---|---|---|---|---|---|---|
| Accum | Accum | Accum | Accum | Accum | Accum | Accum |
| 1A | 2A | 3A | 4A | 5A | 6A | 7A |
| 1B | 2B | 3B | 4B | 5B | 6B | 7B |
| 1C | 2C | 3C | 4C | 5C |  | 7C |
| 1D | 2D |  | 4D | 5D |  | 7D |
|  | 2E |  | 4E |  |  | 7E |
|  | 2F |  | 4F |  |  |  |
|  | 2G |  | 4G |  |  |  |
|  | 2H |  | 4H |  |  |  |
|  | 2I |  |  |  |  |  |

| ARM 1 | | | | |
|---|---|---|---|---|
| ACCUM. DATA | Accumulated Read Time | | Acumulated. Size | |
| EXTENT 1A | Virtual Address | Arm Identifier | Extent Read Time | Extent Size |
| EXTENT 1B | Virtual Address | Arm Identifier | Extent Read Time | Extent Size |
| EXTENT 1C | Virtual Address | Arm Identifier | Extent Read Time | Extent Size |
| EXTENT 1D | Virtual Address | Arm Identifier | Extent Read Time | Extent Size |

FIG. 4

COMPUTER MECHANISM FOR REDUCING DASD ARM CONTENTION DURING PARALLEL PROCESSING

FIELD OF THE INVENTION

This invention generally relates to computer systems. More specifically, this invention relates to a mechanism for improving the performance of a computer system by performing reads from a direct access storage device (DASD) in a manner that tends to minimize arm contention during parallel processing.

BACKGROUND OF THE INVENTION

The development of the EDVAC computer system of 1948 is often cited as the beginning of the computer era. Since that time, computer systems have evolved into extremely sophisticated devices. However, even today's most sophisticated computer systems continue to include many of the basic features that were present in some of the first computer systems. One such feature is a computer system's use of a program to control its actions. These computer programs are a collection of instructions or "jobs" that the computer performs in response to various commands. Because of this, the performance of a computer systems is directly related to speed at which it can process its jobs.

A computer performs a wide variety of jobs during the execution of a program. In single-threaded computer systems, a job is executed sequentially until the job is completed. In contrast, parallel process, multi-tasking or multi-threaded computer systems divide the job into independent tasks and can execute multiple tasks simultaneously. The multiple tasks can be executed using multiple central processing units (CPUs) to execute parallel tasks or by providing software that can make several tasks (or threads) active simultaneously by switching back and forth between active tasks. By executing multiple tasks simultaneously, a parallel processing computer is able to execute program code and perform tasks more efficiently than a single-threaded computer system. The performance increase of a multi-tasking computer system is much more dramatic as multiple processors (i.e., CPUs) are added to provide concurrent processing.

In some cases simultaneous tasks will have conflicting resource needs. For example, in a parallel processing systems, two simultaneous tasks may each wish to access different data at the same storage device. If the data storage device can only handle one task request at a time, the second task will have to wait for the first to finish. This in effect makes the parallel process computer behave as a single-threaded computer for these conflicting tasks by serializing the execution of conflicting tasks, thereby degrading the performance of the computer system.

One particular area where parallel processing systems commonly have resource conflicts is in file read operations. Computer files are typically stored on direct access storage devices, called DASDs. The most common example of a DASD is a hard disk drive, but any storage device that allows direct access to the data it contains may be classified as a DASD. Each DASD accesses its data through one or more access means, typically referred to as DASD arms, because a typical disk drive uses an arm to read data off its surface. For the discussion herein, it is assumed that a DASD has a single arm to access its data, realizing that other DASDs may have multiple arms.

A large computer system typically uses multiple DASDs in a parallel arrangement to store data and program files. Because of this, computer files are generally spread out across multiple DASDs, resulting in different file portions being stored under different arms. With a file spread out across multiple DASDs (and hence under multiple arms), a parallel process computer is able to read the file in parallel fashion with simultaneous tasks reading data from different DASDs (and hence, different arms) simultaneously. This results in faster and more efficient access time for the computer system. If, however, parallel tasks try and access data under the same arm at the same time, one task must wait for the other task to finish before it can proceed. This is called arm contention and results in the read tasks becoming serialized instead of executing in parallel, with read performance being degraded.

In prior art methods for executing read jobs in parallel process computer systems, a round robin approach was used to assign the various tasks to read portions of the file. This involves simply running through the file and assigning tasks to processes in a straight sequential order. This approach is inefficient when the file is not evenly distributed across DASDs. In particular, where the file distribution is heavily skewed toward a few DASDs, the probability of arm contention is increased, especially at the end of the read job where it is more likely that the various tasks will each be attempting to access data under the same arm (i.e., on the same DASD). As a result, tasks that could theoretically run in parallel must wait in line for sequential access to the DASD, creating a bottle-neck in the reading of the file from the DASDs.

As described above, the known methods of parallel processing suffer from drawbacks. Without improved methods and apparatus for allocating simultaneous tasks to different DASD arms during a file read operation, arm contention will continue to be an impediment to system performance.

SUMMARY OF THE INVENTION

It is, therefore, an advantage of this invention to provide an enhanced method and mechanism for reducing arm contention in parallel process computer systems.

It is another advantage of this invention to provide a read task scheduling method that allows for reduced arm contention without requiring specific methods of file storage.

These and other advantage of the present invention are accomplished by the method of the present invention disclosed herein. According to the present invention, an apparatus and method reduces arm contention during file reads for files stored under multiple arms on one or more direct access storage devices (DASDs). According to the present invention, a method is provided that assigns read tasks in a manner that reduces the probability of arm contention during the file reads. First, the plurality of extents storing the file are correlated to their associated arm. Second, for each of the plurality of arms, the attributes of extents under that arm, preferably including the extent read times, are accumulated. Finally, the plurality of simultaneous read tasks are assigned to the plurality of extents according to the accumulated attributes, such that arms that have a greater need for service are favored over arms that have a lesser need when reading the file.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and:

FIG. 3 is a symbolic representation of a linked arm table 300 in accordance with a preferred embodiment of the present invention;

FIG. 4 is a symbolic representation of a portion 400 of arm table 300 illustrated in FIG. 3.

DESCRIPTION OF THE PREFERRED EMBODIMENTS

Overview

Figure 1:
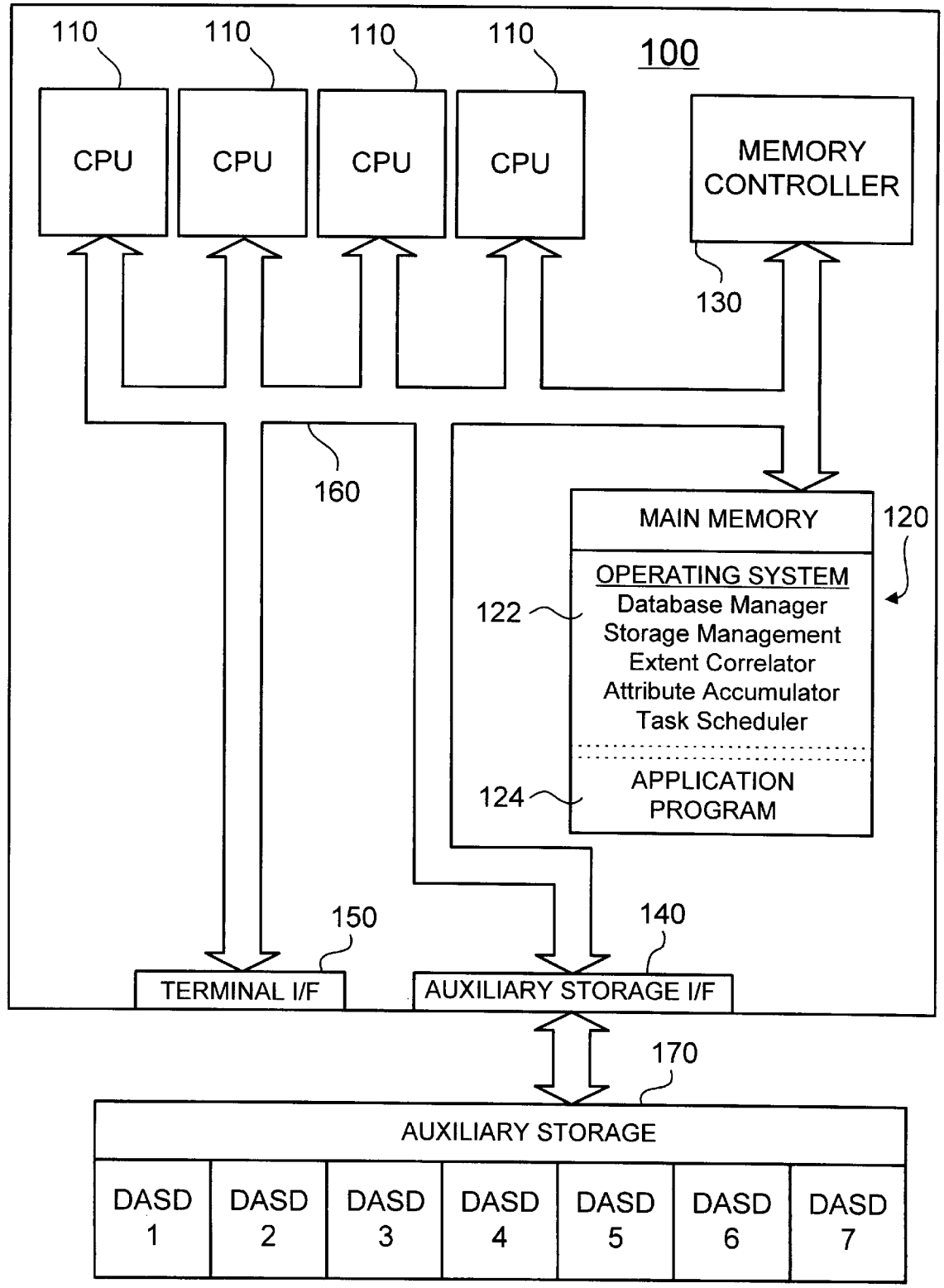
FIG. 1 is a schematic block diagram of a computer system in accordance with a preferred embodiment of the present invention.

The method and apparatus of the present invention has particular applicability to the field of computers, specifically to the methods used in parallel processing, and particularly to input and output scheduling in parallel processing. For those individuals who are not computer experts, a brief overview of arm contention on a parallel processing computer is provided.

Arm Contention

As discussed in the Background section, parallel processing allows for better performance in a computer system. In particular, increasing the number of processors allows for a higher number of tasks to execute concurrently. While multi-tasking computer systems are possible using a single processor, the present invention has particular application to multiple processor systems, in which two or more processors may need to access data under the same DASD arm simultaneously. When two tasks need access to data under the same DASD arm at the same time, arm contention occurs, resulting in the tasks using the DASD arm being serialized rather than executing in parallel.

An illustration of arm contention follows. Assume that a portion of a computer program includes a job for reading a file. That read job may be executed by multiple tasks, each of which read a portion of the file. In a parallel processing system, several of the read tasks can be executed simultaneously. This results in faster read performance. Unfortunately, where the various tasks need simultaneous access to data under the same DASD arm, parallel processing is impossible as one task must wait for the other to finish before starting its read. In effect, because the one task must wait for the other to finish, the work becomes serialized.

Input/Output Scheduling in Parallel Processing

The problem of parallel processing becoming serialized is particularly acute in the context of I/O scheduling. In most advanced computer systems, data and program files are stored in a wide variety of storage devices. These storage devices (DASDs) store data in a variety of ways on a variety of mediums. In each DASD, the data is accessed through an access means, typically by one or more arms, where the arm is coupled to a mechanical head that moves across the DASD storage medium reading and writing the data on the storage medium.

For the purpose of illustrating the concepts of the present invention below, it is assumed that a DASD has a single arm, and that simultaneous read tasks from the same DASD thus result in arm contention. Of course, those skilled in the art will realize that this illustrative example is one of selection, and that the concepts of the present invention applies equally to DASDs with multiple arms. Of primary concern is the minimization of arm contention in a computer system, regardless of where the arms are physically located.

As described above, arm contention occurs where multiple simultaneously tasks try to each read data under the same arm in the same DASD. The arm contention results in the tasks performing the data reads becoming serialized, i.e., one task must wait for the other to finish using the DASD arm before it can begin reading the file. The problem is particularly acute where there are more portions of the file stored under some arms than others.

Figure 2:
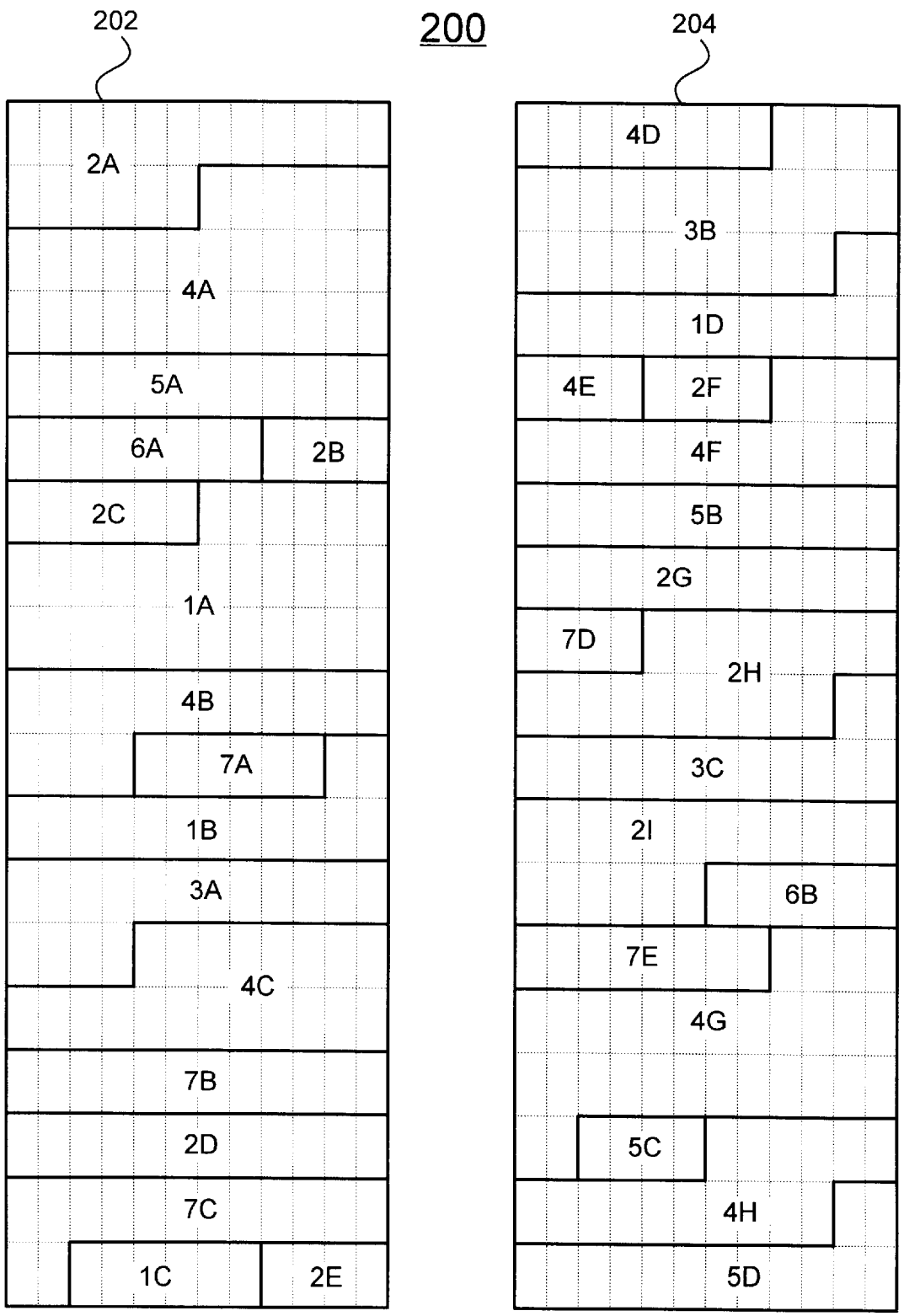
FIG. 2 is a symbolic representation of a computer file 200.

Turning now to FIG. 2, FIG. 2 is a symbolic representation of a computer file 200, such as a data file or program file. In a typical embodiment, the computer file 200 is accessed as a plurality of file segments. In the illustrated embodiment, the file is stored as two 16 megabyte (MB) segments 202 and 204. These two file segments are physically stored on a plurality of DASD devices, in a plurality of physical sections, called extents.

In a typical computer system a storage management system keeps track of the location and size of the various extents that store the portions of the file 200. Thus, when that file is accessed, storage management can direct the operation of the computer to find the file in its physical location on the various DASDs.

In one known prior art parallel processing method for reading a file, a round robin approach was used to assign the read tasks to read portions of the file. In this approach, the file is divided up into roughly equal sized portions. This division of the file into portions typically bears no relation to the actual location of the file on the DASDs, resulting in portions that may span across physical extents.

The different portions of the file are then assigned to the various tasks, typically using a round robin approach, where each task that completes is assigned to the next portion of the file to be read. This round robin approach increases the probability of arm contention in two ways. First, individual portions may span the multiple physical extents on which the file is stored. Where simultaneous tasks attempt to read portions of the file that span multiple extents across multiple arms, the probability of arm contention is increased. Additionally, in the case where larger portions of the file are stored under some arms then under others, as the read job ends the final tasks are more likely to be under the heavily used arms. The result is that the final tasks may need data under the same arm, again increasing the probability of arm contention. When arm contention occurs, the read jobs become serialized, thereby reducing the performance of a multi-processing computer system.

The remainder of this specification describes how a preferred embodiment of the present invention improves the read access method for parallel processing. The preferred embodiment provides a scheduling mechanism for determining the read order of simultaneous tasks. Those skilled in the art will appreciate that the present invention applies equally to any input/output scheduling in parallel processing.

DETAILED DESCRIPTION

Turning now to FIG. 1, FIG. 1 illustrates a computer system 100 in accordance with the present invention and is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises at least one CPU 110, (in the illustrated system, four CPUs 110), main memory 120, a memory controller 130, an auxiliary storage interface 140, and a terminal interface 150, all of which are interconnected via a system bus 160. Additionally, computer system 100 comprises auxiliary storage 170. Note that various modifications, additions, or deletions may be made to the computer system 100 illustrated in FIG. 1 within the scope of the present invention such as the addition of cache memory or other peripheral devices. FIG. 1 is presented to simply illustrate some of the salient features of computer system 100.

CPUs 110 perform computation and control functions of computer system 100. CPUs 110 may each comprise a single integrated circuit, such as a microprocessor, or may each comprise any suitable number of integrated circuit devices and/or circuit boards working in cooperation to accomplish the functions of a central processing unit.

Memory controller 130, through use of a processor separate from CPUs 110, is responsible for moving requested information from main memory 220 and/or through auxiliary storage interface 140 to CPU 110. While for the purposes of explanation, memory controller 130 is shown as a separate entity, those skilled in the art understand that, in practice, portions of the function provided by memory controller 130 may actually reside in the circuitry associated with CPU 110, main memory 120, and/or auxiliary storage interface 140.

Terminal interface 150 allows system administrators and computer programmers to communicate with computer system 100, normally through programmable workstations. Although the system 100 depicted in FIG. 1 contains four main CPUs 110, and a single system bus 160, it should be understood that the present invention applies equally to computer systems having greater or fewer main CPUs and multiple system buses. Similarly, although the system bus 160 of the preferred embodiment is a typical hardwired, multidrop bus, any connection means that supports bi-directional communication could be used.

In accordance with the preferred embodiment, main memory 120 stores an operating system 122 and an application program 124. Generally, the operating system 122 is used to perform all I/O operations such as accesses to a DASD device. In particular, the operating system 122 includes a database manager and a storage management system. Of course, these functions could be maintained other places, such as in the application 124 itself.

The database manager and storage management facilitate and control the I/O operations of computer system 100. In particular, files are stored and accessed by application programs 124 using a virtual address. Thus, when an application seeks to write a file, it will make a write to a virtual address for that file. Database management will then give that virtual address to storage management, which will then store the file, typically across several DASDs. Storage management contains a mechanism for storing a "map" of the physical extents that were used to store the file. When an application seeks to read a file, it will perform a read request for that file. Database management will then translate that read request to the appropriate virtual address. Database management then gives that virtual address to storage management, which will access the file according to the "map" of the physical extents containing different portions of the file. These extents will typically be stored across multiple DASDs, resulting in the potential for arm contention when reading the file. The application and database management thus does not need to keep actual track of the file, instead the application need only make a read request and database management must only know the associated file's virtual address.

In the preferred embodiment, operating system 122 and an application program 124 are each adapted for parallel processing Thus, application program 124 contains various instructions or jobs to be completed in its operation. Each of these jobs are typically completed using a plurality of tasks. In the parallel processing environment, several tasks can be executed simultaneously. For example, in the illustrated computer system 100, four tasks can be executed simultaneously by the four CPUs 110. The operating system will typically control what each task will be assigned to at any given time.

It should also be understood that main memory 120 will not necessarily contain all parts of all mechanisms shown. For example, portions of operating system 122 and application program 124 may be stored in auxiliary storage 170. Main memory 120 is used generically to include any suitable type of computer system memory (e.g., DRAM, disk, CD-ROM, etc.)

Auxiliary storage interface 140 is used to allow computer system 100 to store and retrieve information from auxiliary storage 170. Auxiliary storage 170 comprises a plurality of direct access storage devices (DASD 1–7). Each DASD can be any type of direct access storage device, such as a magnetic disk (e.g., hard disks or floppy diskettes) or optical storage devices (e.g., CD-ROM). Of course, auxiliary storage 170 could have significantly more or less DASD elements, depending upon the size and sophistication of computer system 100. Each DASD device accesses data through an access means, typically by one or more arms, where the arm is coupled to a mechanical head that moves across the DASD storage medium reading and writing the data on the DASD.

For purposes of illustrating the preferred embodiment, the various DASDs of auxiliary storage 170 are each assumed to have a single arm. Additionally, each is simplified in that each DASD is assumed to have equal data read access times. Of course, the preferred embodiment is equally applicable to DASDs with multiple arms or differing read times.

Auxiliary storage 170 stores the program and data files used by computer system 100. For purposes of describing the preferred embodiments, auxiliary storage 170 is assumed to store computer file 200 of FIG. 2. Again, computer file 200 is accessed by application programs as a plurality of file segments according to a virtual address. These file segments are physically stored on a plurality of DASD devices, in a plurality of physical sections, called extents. The extent size is typically from 512 bytes to 1 MB. File 200 is shown as being divided into portions that correspond to the various extents on various DASDs on which the extent is physically located. These file portions are labeled 1A–1D, 2A–2I, 3A–3C, 4A–4H, 5A–5D, 6A–6B and 7A–7B, where the number represents the DASD device arm and the letter represents the extent on which the file portion is physically located on the device. Thus, the fifth file portion on file segment 202 is located at extent 2B, where extent 2B is the second extent on DASD 2.

File 200 is not evenly distributed across DASDs 1–7. Instead, the bulk of the file is stored on DASD 4 and DASD 2. This situation can result from the way storage management writes a file. Generally, storage management writes a file using a round robin sequence, spreading the file out across all the DASD elements. But storage management will skew the file toward those DASD elements that are currently underutilized, such as a DASD that has just been added to the system. This can result in greater portions of the file being written on one DASD than on other DASDs, creating unequal distributions that would result in read tasks become serialized under prior art approaches.

According to the preferred embodiment, a method of reading computer file 200 is provided that overcomes the limitations of the prior art. In particular, the preferred embodiment lessens the probability of arm contention when a read job is executed by multiple tasks simultaneously. First, the plurality of extents storing the file are correlated to their associated arm. Second, for each of the plurality of arms, the attributes of extents under that arm, preferably including the extent read times, are accumulated. Finally, the plurality of simultaneous read tasks are assigned to the plurality of extents according to the accumulated attributes, such that arms that have a greater need for service are favored over arms that have a lesser need when reading the file. In the preferred embodiment the extent attributes are linked together to build an arm table. Additionally, the attributes are accumulated for each arm. Then, the arm table is used to order the allocation of tasks, decreasing the probability of arm contention between concurrent tasks.

Turning now to FIG. 3, FIG. 3 is a symbolic representation of a linked arm table 300 in accordance with a preferred embodiment of the present invention. Arm table 300 is built to correlate the physical extents on which file 200 is stored to the corresponding arms. Arm table 300 facilitates a reduction in arm contention while reading a file, such as file 200 of FIG. 2.

In the preferred embodiment, arm table 300 is built and stored as part of the file, and is maintained by the database manager. For example, to build an arm table for file 200, the database manager queries storage management regarding the location and size of extents that store portions of the file under each arm. With this information the database manager can build and maintain arm table 300. An arm table thus built and maintained contains the information necessary to read its associated file in accordance with the preferred embodiment, reducing the probability of arm contention.

Arm table 300 stores data relating to each extent of file 200. Thus, arm table 300 will contain at least one entry for each physical extent allocated to file 200, and will contain a list of all task reads that will be performed for a particular job. In arm table 300, the data for each extent is internally linked according to the arm under which it is located. In the illustrative embodiment, each DASD 1–7 of FIG. 1 has only one associated arm. Thus, in this simplified case, the extents are internally linked according to the arms 1–7 used to access these extents. Using this linkage, various accumulated data totals can be stored in arm table 300.

Arm table 300 of FIG. 3 is illustrated as a table of linked data arranged in a particular format. However, the table format shown is for purposes of illustration, and the term arm table as used herein includes any manner of correlating extents to their associated arms and accumulating attributes of the extents for each arm, and is within the scope of the present invention.

Turning now to FIG. 4, FIG. 4 is a symbolic representation of a portion 400 of arm table 300 illustrated in FIG. 3, showing the data stored in arm table 300 for arm 1. Portion 400 stores the virtual address, the arm identifier, the extent read time and the extent size for each extent under arm 1. Computed from this data, portion 400 also stores the total accumulated read time and accumulated size for all extents under arm 1. Similar data is also stored for the remaining arms 2–7 under which file 200 is stored.

In particular, the virtual address of each extent is stored to facilitate communication between the database manager and storage management regarding that extent. In addition, the arm identifier of each extent is stored. The arm identifier tells arm table 300 under which arm the extent is stored. The arm identifier is the field used to group extents under a given arm together. As the entries in arm table 300 are grouped according to the arm the extents are under, the accumulated read time and accumulated size for each arm may be computed. Each entry in arm table 300 also contains the size of the extent corresponding to the entry. The extent size is the actual size of the physical extent measured in bytes of data.

In addition, the read time of each extent is stored for each entry in arm table 300. Of course, for the preferred embodiment described herein, the extent read time is generally proportional to the extent size for extents stored, since the DASDs are assumed to have identical read times. However for alternative embodiments where extents are stored in different DASDs, each having different access times, the various extent read times will not be proportional according to size with extents located on these other devices, and the read time for each extent in arm table 300 provides information not readily identifiable from the extent size field.

Thus, for each extent under each arm, arm table 300 stores the virtual address of the extent, the arm identifier, the extent read time, and the extent size. From this data, the accumulated read time and accumulated size for each arm under which portions of the file are located is computed and stored in arm table 300. The accumulated size is the sum of all extent size fields for a given arm. Likewise, the accumulated read time is the sum of all extent read time fields for a given arm. With this data stored in arm table 300, all the relevant characteristics of a file are stored which allow for minimizing arm contention according to the preferred embodiment.

The data in arm table 300 corresponds to the components of file 200. Thus, as the size and location of file 200 changes, arm table 300 will need to be updated to reflect those changes. For example, file 200 will change when new data is added, requiring more extents to be used. The arm table 300 could be totally rebuilt or only updated to reflect the changes that were made to file 200.

Figure 5:
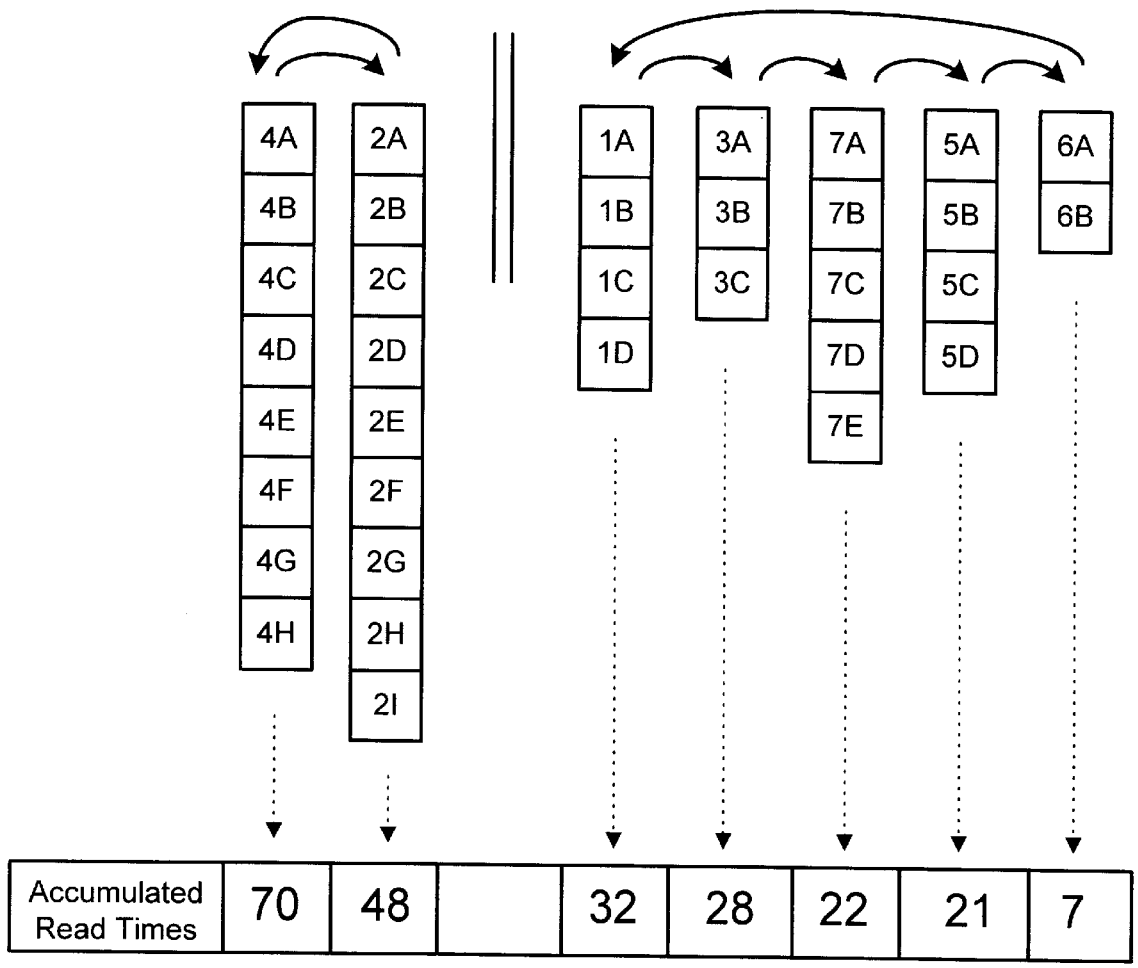
FIG. 5 is a symbolic representation of a task order scheme for a read job in accordance with the preferred embodiment.

Turning now to FIG. 5, FIG. 5 is a symbolic representation of a task scheduling scheme for a read job in accordance with the preferred embodiment. In the prior art, a round robin approach was used, simply running through the file and assigning tasks to file portions in a sequential order.

According to the preferred embodiment of the invention, the first step is to order the arm entries of the arm table according to accumulated read time as stored in arm table 300. Thus, the entries of arm table 300 are ordered according to their accumulated read times, from longest to shortest. Again, in the simplified example of file 200, each DASD 1–7 is assumed to have equal access times, and thus the accumulated read time for an arm is directly proportional to the accumulated extent size. This results in the arm entries of arm table 300 having the following order: arm 4, arm 2, arm 1, arm 3, arm 7, arm 5 and arm 6. With DASDs that have different access times, the difference in read times is accounted for by ordering the arms according to accumulated read time for data under the arm and not accumulated extent size.

In the illustrated embodiment, the individual extent entries for each arm column are ordered according to file location, i.e., 1A, 1B, 1C, 1D. Of course other schemes could be used to order the individual extent entries. For example, in addition to ordering the arm table entries according to file location, the individual extent entries in each arm column could be ordered by extent read time, i.e., 1A, 1B, 1D, 1C. Another method would be to order the individual extent entries according to extent location under the arm in order to minimize arm movement and seek time.

Next, the ordered entries of the arm table are divided according to their read times. In the preferred embodiment, the arm table is divided into two sections, each containing approximately half of the file as measured by read time. In the illustrated example, the ordered entries are divided between arm 2 and arm 1. This division results in one group (arms 4 and 2) with a total read time of 118, and a second group (arms 1, 3, 7, 5 and 6) with a total read time of 110, as illustrated in FIG. 5.

Of course, different schemes could be us ed to divide the ordered entries. For example, the ordered entries could be divided into a number of portions, relating to the number of tasks expected to be used by the read job. Additionally, by dividing the ordered entries into a number of portions equal to the number of tasks available , each task can be assigned to a group of tasks in a particular portion.

Next, the divided ordered entries are read sequentially in a round robin fashion within each group while alternating between groups for each task assigned. Thus, the arms are ordered from longest to shortest accumulated read time, divided approximately in half, and then read in round robin fashion from the two lists. In the illustrated example, this results in the tasks reading the extents in the following order: 4A, 1A, 2A, 3A, 4B, 7A, 2B, 5A, 4C, 6A, 2C, 1B, 4D, 3B, 2D, 7B, 4E, 5B, 2E, 6B, 4F, 1C, 2F, 3C, 4G, 7C, 2G, 5C, 4H, 1D, 2H, 7D, 2I, 5D, 7E.

In the illustrated example, four tasks can be executed simultaneously by computer system 100. Thus, in the preferred embodiment the first task is allocated to the first extent of the first arm entry in the first group. In the illustrated example, extent 4A. The second task is allocated to the first extent of the first arm entry of the second group. In the illustrated example, extent 1A. The third task is allocated to the first extent of the second arm entry in the first group. In the illustrated example, extent 2A. The fourth task is allocated to the first extent of the second arm entry in the second group. In the illustrated example, extent 3A. When a task is finished, it goes to the next extent in the order listed above. In the illustrated example, extent 3A is the smallest, and the task reading that extent will be done first. That task will then be assigned to read the next extent, extent 4B. This read routine is continued until the entire file has been read.

This method of reading portions of file 200 in a round robin fashion within a group, but alternating between groups, decreases the probability of arm contention and thus increases the probability of the read job being multi-tasked all the way through. Prior art approaches use a database management perspective to assign read tasks. The prior art database management perspective simply assigned portions of the file to a task, regardless of the actual physical location of the portion and the conflicts such an attempted read could create. The prior art method ignores the method the storage management system used to store the file to begin with. The preferred embodiment instead uses a storage management perspective, i.e., the database manager orders a read job, but the order of the tasks executed to complete that job is determined by the information contained by the attributes of the extents used to store file 200.

By building arm table 300, dividing arm table 300 into a number of portions that have approximately equal read times, and by assigning tasks to alternating groups according to a round robin scheme within the group, the arms that have greater read times are favored more heavily than arms with less read time. The result, as shown in the list above for the example of FIG. 5, succeeds in minimizing arm contention by scheduling tasks to read extents in an order that is less likely to produce arm contention.

Additionally, using the method of the preferred embodiment does not require the file be re-ordered, or otherwise stored in a particular way. Instead, this method is fully implemented by the creation of an arm table and the parallel reading of the file according to the information stored in the arm table. Thus, the method of the preferred embodiment works regardless of the scheme used to store the file, and may therefore be used to enhance the performance of any computer system that is multi-tasking and stores data on multiple DASDs (i.e., under different arms).

It is important to note that while the present invention has been described in the context of a method for reading a file by an operating system, those skilled in the art will appreciate that the present invention has application as a computer implemented method in the context of a fully functional computer system. Additionally, the present invention, when incorporated into an operating system, is capable of being distributed as a program product via floppy disk, CD ROM, or other form of recordable media or via any type of electronic transmission mechanism.

While the invention has been particularly shown and described with reference to preferred exemplary embodiments thereof, it will be understood by those skilled in the art that various changes in form and details may be made therein without departing from the spirit and scope of the invention. For example, the preferred embodiment can be implemented for any type of source code and hardware platform combination.

We claim:

1. A computer apparatus comprising:
   (A) at least one central processing unit;
   (B) at least one direct access storage device, said at least one direct access storage device having a plurality of arms;
   (C) a program, said program being executed by said at least one central processing unit, and in response thereto, said at least one central processing unit performing multiple tasks simultaneously to read at least one file stored on a plurality of extents under said plurality of arms, the program comprising:
   i) an extent correlator, said extent correlator correlating said plurality of extents for said at least one file to said plurality of arms;
   ii) an attribute accumulator, said attribute accumulator accumulating for each of said plurality of arms the attributes of said plurality of extents corresponding to said arm; and
   iii) a task scheduler, said task scheduler scheduling a plurality of tasks to read said plurality of extents from under said plurality of arms according to the accumulated attributes of said plurality of extents.

2. The computer apparatus of claim 1 wherein said accumulated attributes of said plurality of corresponding extents are proportional to extent read time.

3. The computer apparatus of claim 1 wherein said accumulated attributes of said plurality of corresponding extents are proportional to extent size.

4. The computer apparatus of claim 1 wherein said attribute accumulator builds an arm table, said arm table comprising a plurality of entries, each of said plurality of entries corresponding to at least one of said plurality of extents.

5. The computer apparatus of claim 1 wherein said task scheduler:
i) divides said extents into a plurality of groups according to said accumulated attributes of said plurality of extents; and
ii) reads said at least one file by assigning read tasks to said extents by alternating between said plurality of groups and sequentially reading said associated entries within said groups.

6. The computer apparatus of claim 1 wherein:
i) said attribute accumulator builds an arm table, said arm table comprising a plurality of entries, each of said plurality of entries corresponding to at least one of said plurality of extents; and
ii) said task scheduler:
1) orders said arm table according to accumulated read time of the extents corresponding to each of said plurality of arms;
2) divides said ordered arm table into a plurality of groups; and
3) reads said at least one file by assigning read tasks to said extents by alternating between said plurality of arm table groups and sequentially reading said associated entries within said groups.

7. A program product comprising:
a recordable media; and
a program recorded on the recordable media, said program capable of executing multiple tasks simultaneously to read at least one file stored on a plurality of extents under a plurality of arms, the program comprising:
i) an extent correlator, said extent correlator correlating said plurality of extents for said at least one file to said plurality of arms;
ii) an attribute accumulator, said attribute accumulator accumulating for each of said plurality of arms the attributes of said plurality of extents corresponding to the said arm; and
iii) a task scheduler, said task scheduler scheduling a plurality of tasks to read said plurality of extents from under said plurality of arms according to the accumulated attributes of said plurality of extents.

8. The program product of claim 7 wherein said accumulated attributes of said plurality of corresponding extents are proportional to extent read time.

9. The program product of claim 7 wherein said accumulated attributes of said plurality of corresponding extents are proportional to extent size.

10. The program product of claim 7 wherein said attribute accumulator builds an arm table, said arm table comprising a plurality of entries, each of said plurality of entries corresponding to at least one of said plurality of extents.

11. The program product of claim 7 wherein said task scheduler:
i) divides said extents into a plurality of groups according to said accumulated attributes of said plurality of extents; and
ii) reads said at least one file by assigning read tasks to said extents by alternating between said plurality of groups and sequentially reading said associated entries within said groups.

12. The program product of claim 7 wherein:
i) said attribute accumulator builds an arm table, said arm table comprising a plurality of entries, each of said plurality of entries corresponding to at least one of said plurality of extents; and ii) said task scheduler:
1) orders said arm table according to accumulated read time of the extents corresponding to each of said plurality of arms;
2) divides said ordered arm table into a plurality of groups; and
3) reads said at least one file by assigning read tasks to said extents by alternating between said plurality of arm table groups and sequentially reading said associated entries within said groups.

13. A method for reducing arm contention in a computer system executing multiple tasks simultaneously to read at least one file stored on a plurality of extents under a plurality of arms, the method comprising the steps of:
a) correlating said plurality of extents for said at least one file to said plurality of arms;
b) for each of said plurality of arms, accumulating the attributes of said plurality of extents corresponding to said arm; and
c) assigning a plurality of tasks to read said plurality of extents according to the accumulated attributes of said plurality of extents.

14. The method of claim 13 wherein said accumulated attributes of said plurality of corresponding extents are proportional to extent read time.

15. The method of claim 13 wherein said accumulated attributes of said plurality of corresponding extents are proportional to extent size.

16. The method of claim 13 wherein the step of accumulating attributes comprises building an arm table, said arm table comprising a plurality of entries, each of said plurality of entries corresponding to at least one of said plurality of extents.

17. The method of claim 13 wherein the step of assigning a plurality of tasks to read said plurality of extents comprises:
i) dividing said extents into a plurality of groups according to said accumulated attributes of said plurality of extents; and
ii) reading said a t least one file by assigning read tasks to said extents by alternating between said plurality of groups and sequentially reading said associated entries within said groups.

18. The method of claim 13 wherein:
i) the step of accumulating attributes comprises building an arm table, said arm table comprising a plurality of entries, each of said plurality of entries corresponding to at least one of said plurality of extents; and
ii) the step of assigning a plurality of tasks to read said plurality of extents comprises:
1) ordering said arm table according to accumulated read time of the extents corresponding to each of said plurality of arms;
2) dividing said ordered arm table into a plurality of groups; and
3) reading said at least one file by assigning read tasks to said extents by alternating between said plurality of arm table groups and sequentially reading said associated entries within said groups.

19. A method for reducing arm contention in a computer system executing multiple tasks simultaneously to read at least one file stored on a plurality of extents under a plurality of arms where each of said plurality of extents has an associated arm, the method comprising the steps of:
a) building an arm table, said arm table comprising a plurality of entries, each of said plurality of entries corresponding to at least one of said plurality of extents;

b) ordering said arm table according to the extents corresponding to each of said plurality of arms;

c) dividing said ordered arm table into a plurality of groups; and d) reading said at least one file by assigning read tasks to said extents by alternating between said plurality of arm table groups and sequentially reading said associated entries within said groups.

20. The method of claim 19 wherein said plurality of entries including an entry proportional to read time corresponding extent and wherein the step of ordering said arm table is according to accumulated said entries proportional to read time.

21. A computer implemented method for reducing arm contention in a computer system executing multiple tasks simultaneously to read at least one file stored on a plurality of extents under a plurality of arms, the method comprising the steps of:

a) correlating said plurality of extents for said at least one file to said plurality of arms;

b) for each of said plurality of arms, accumulating the attributes of said plurality of extents corresponding to said arm; and c) assigning a plurality of tasks to read said plurality of extents according to the accumulated attributes of said plurality of extents.

22. The method of claim 21 wherein said accumulated attributes of said plurality of corresponding extents are proportional to extent read time.

23. The method of claim 21 wherein said accumulated attributes of said plurality of corresponding extents are proportional to extent size.

24. The method of claim 21 wherein the step of accumulating attributes comprises building an arm table, said arm table comprising a plurality of entries, each of said plurality of entries corresponding to at least one of said plurality of extents.

25. The method of claim 21 wherein the step of assigning a plurality of tasks to read said plurality of extents comprises:

i) dividing said extents into a plurality of groups according to said accumulated attributes of said plurality of extents; and ii) reading said at least one file by assigning read tasks to said extents by alternating between said plurality of groups and sequentially reading said associated entries within said groups.

26. The method of claim 21 wherein:

i) the step of accumulating attributes comprises building an arm table, said arm table comprising a plurality of entries, each of said plurality of entries corresponding to at least one of said plurality of extents; and ii) the step of assigning a plurality of tasks to read said plurality of extents comprises:

1) ordering said arm table according to accumulated read time of the extents corresponding to each of said plurality of arms;

2) dividing said ordered arm table into a plurality of groups; and 3) reading said at least one file by assigning read tasks to said extents by alternating between said plurality of arm table groups and sequentially reading said associated entries within said groups.

27. A method for distributing a program product comprising the steps of:

initiating a connection between a first computer system and a second computer system;

transmitting the program product from a first computer system to a second computer system, the program capable of executing multiple tasks simultaneously to read at least one file stored on a plurality of extents under said plurality of arms, the program comprising:

i) an extent correlator, said extent correlator correlating said plurality of extents for said at least one file to said plurality of arms;

ii) an attribute accumulator, said attribute accumulator accumulating for each of said plurality of arms the attributes of said plurality of extents corresponding to said arm; and iii) a task scheduler, said task scheduler scheduling a plurality of tasks to read said plurality of extents from under said plurality of arms according to the accumulated attributes of said plurality of extents.

28. The distribution method of claim 27 wherein said accumulated attributes of said plurality of corresponding extents are proportional to extent read time.

29. The distribution method of claim 27 wherein said accumulated attributes of said plurality of corresponding extents are proportional to extent size.

30. The distribution method of claim 27 wherein said attribute accumulator builds an arm table, said arm table comprising a plurality of entries, each of said plurality of entries corresponding to at least one of said plurality of extents.

31. The distribution method of claim 27 wherein said t ask scheduler:

i) divides said extents into a plurality of group s according to said accumulated attributes of said plurality of extents; and ii) reads said at least one file by assigning read tasks to said extents by alternating between said plurality of groups and sequentially reading said associated entries within said groups.

32. The distribution method of claim 27 wherein:

i) said attribute accumulator builds an arm table, said arm table comprising a plurality of entries, each of said plurality of entries corresponding to at least one of said plurality of extents; and ii) said task scheduler:

1) orders said arm table according to accumulated read time of the extents corresponding to each of said plurality of arms;

2) divides said ordered arm table into a plurality of groups; and 3) reads said at least one file by assigning read tasks to said extents by alternating between said plurality of arm table groups and sequentially reading said associated entries within said groups.

* * * * *